INVENTOR.
ROBERT N. JUNGLES
ATTORNEY

Jan. 13, 1959

R. N. JUNGLES 2,868,536

CONSTANT LOAD METERING DEVICE

Filed May 27, 1954

INVENTOR.
ROBERT N. JUNGLES
BY
ATTORNEY

United States Patent Office 2,868,536
Patented Jan. 13, 1959

2,868,536
CONSTANT LOAD METERING DEVICE

Robert N. Jungles, Parma, Ohio, assignor to Cleveland Pneumatic Industries, Inc., a corporation of Ohio Application May 27, 1954, Serial No. 432,656

8 Claims. (Cl. 267—64)

This invention pertains broadly to shock absorbers, but more particularly to shock absorbing struts for airplanes.

In special purpose airplanes, when the ratio of distance of the center of gravity above the ground to the wheel base or the wheel tread distance is relatively large, landing has been found to be relatively unstable especially in cases of one wheel landing or when the normal airplane vertical axis is not perpendicular to the ground at the time of contact. In such cases the relatively soft oleo action produced by the usual landing gear shock absorbing strut had the tendency to allow the low side of the airplane to settle even lower with the danger of the airplane toppling over when the wheel on the opposite side contacted the ground.

It is therefore one object of this invention to produce a landing gear shock absorbing strut especially suitable for such airplanes.

Another object of this invention is to produce a landing gear shock absorbing strut capable of developing the maximum allowable load very early in the compression stroke and to maintain that load for whatever length of stroke is necessary to dissipate the energy.

More particularly, the invention contemplates to control, at the time of landing, liquid flow within an airplane shock absorbing strut in a manner causing the strut to quickly and effectively oppose the maximum load to which it may be subjected. To that end, the strut is equipped with self-contained valve means controlling liquid flow so as to enable allowable load to develop rapidly but without sudden displacement of liquid and pressure increase above that needed to effectively oppose the load.

Under certain landing conditions, the strut is subjected to high bending moments which develop frictional forces tending to assist the fluid pressure in opposing compression of the strut. These friction forces are greatest during the initial compression of the strut, that is when it is most fully extended, and are reduced as the strut compresses. It is also the purpose of this invention to provide valve means to prevent excessive ground reaction by regulating liquid flow at relatively low pressure during the very initial compression of the strut.

Other objects of this invention will be apparent from the following detailed description wherein similar characters of reference designate corresponding parts and wherein.

Figure 1:
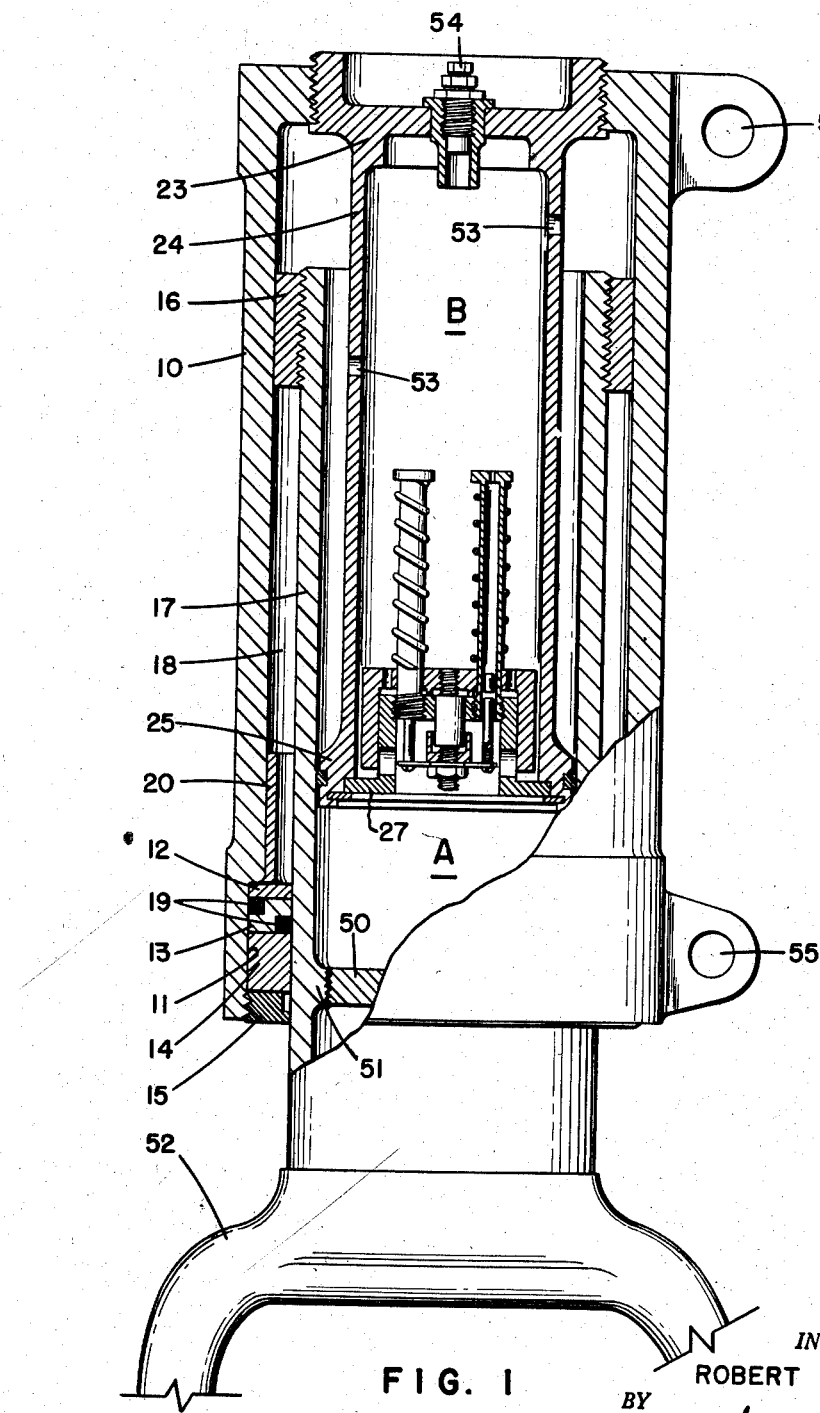
Figure 1 is a longitudinal view of a shock absorbing strut embodying the invention.
Figure 2:
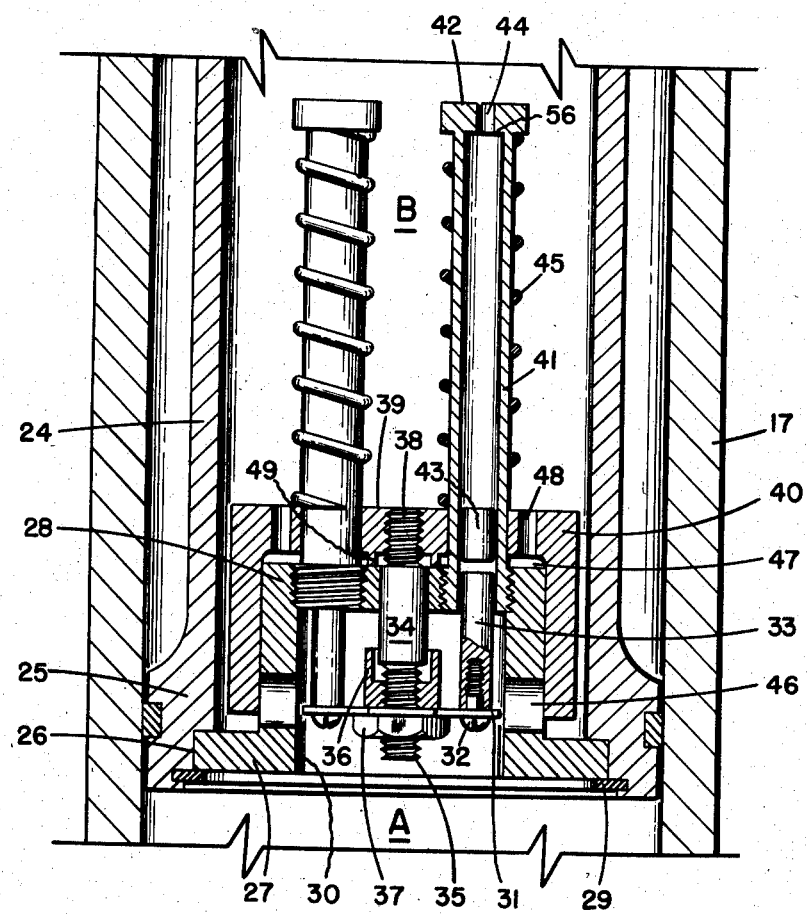
Figure 2 is an enlarged view of a portion of Figure 1.

The invention is shown in the drawing in an embodiment which includes a cylindrical outer casing 10 having an enlarged inner end or counterbore 11 in which is located a washer 12, a collar 13 carrying packings 19 and a bushing 14, all retained against the bottom of the counterbore 11 by a nut 15. A collar 16 is slidable in the casing 10, and has a lower cylindrical casing 17 fixed thereto and depending therefrom to telescope through the inner end of casing 10. A sleeve 20 is located within the lower end portion of an annular chamber 18 between the two casings 10 and 17 with one end resting on the washer 12 and the other end engageable by the collar 16 to limit the extension of the strut.

The outer casing 10 has its upper end connected to an inner cylindrical casing 24 by a head 23, both casings being arranged to telescope within the lower casing 17 which is of intermediate diameter. The inner end of casing 24 carries a piston 25 closely fitted for slidable engagement with the inner wall of casing 17, and provided with a counterbore 26 having fitted therein the external annular flange 27 of an inverted cup-shaped piston block 28. This block, which is part of piston 25, extends into the lower end portion of casing 24 and is retained in the counterbore 26 by a spring clip 29. The interior of block 28 is provided with a cylindrical recess 30 in which is slidably mounted a relatively thin, three arm spider piston 31, having fixed on its arms by screws 32, three equally spaced upwardly extending cylindrical stems 33. This piston has its central portion also carrying a central stem 34 which has a lower threaded end 35 extending through the piston where it is secured on one side thereof by a collar 36 and on the other side by a nut 37. The central stem 34 extends centrally through the upper end of the piston block 28, and is provided with a threaded end portion 38 screwed within the cross wall 39 of an inverted cup-shaped valve 40 slidably mounted on the block 28 in spaced relationship with the interior of the casing 24, and having stops 49 depending from its cross wall 39 for engagement with the upper end of the block 28 to limit the downward movement of the valve relative to the block.

Each stem 33 is located within the lower end of a tube 41, which is screwed into the cross wall of the block 28 and extends upwardly therefrom into casing 24 through the cross wall 39 of the valve 40. The tube 41 is internally larger than the stem 33 to enable free flow of pressure fluid therebetween, and in its upper end is provided with an internal annular shoulder 56 from which leads an outlet port 44. Externally, the upper end of tube 41 is formed with an enlarged head 42 forming an external seat for one end of a compression spring 45, while the other end thereof rests against the valve 40. A relatively short floating piston 43, of a diameter about equal to that of the stem 33, is loosely mounted within the tube 41 and adapted to engage shoulder 56 to close outlet port 44.

Extending radially through the piston block 28 are two or more ports 46 controlled by the valve 40 while the space or chamber 47 between the cross walls 28 and 39 of the block and valve is in constant communication with the interior of casing 24 through ports 48.

As clearly shown in Figure 1, the shock absorbing strut is provided with two chambers A and B, the chamber A being formed between the flange 27 and a bulkhead 50, screwed within an internal annular rib 51 provided within casing 17 adjacent the lower end thereof, which chamber is entirely filled with hydraulic fluid. This lower end of casing 17 is also provided with an integral yoke 52 on which is operatively mounted a landing wheel not shown. Chamber B is formed by the space within casing 24 above piston 25 and the space between the casings 24 and 17, this last space being in communication with the interior of casing 24 through a plurality of longitudinally spaced radial ports 53. The chamber B is partly filled with hydraulic fluid under a head of compressed air admitted thereinto through combination filler plug and valve 54 mounted within the head 23, while the outer casing 10 is formed with lugs 55 through which the strut may be operatively affixed to the body of the airplane.

In practice, each landing gear strut is equipped with one or more shock absorbing struts embodying the invention, with each strut properly affixed to the airplane in substantially vertical operative position, and, of course, with a yoke 52 carrying the landing wheel at the lower end of the strut. Prior to landing, the strut is fully extended with the valve 40, responsive to the action of the springs 45, held in a partly closed position relative to the radial ports 46, and with the hydraulic pressure within chambers A and B substantially equalized. In this instance, it will be understood that while the valve has reached its downward extreme position which is limited by the engagement of the stops 49 with the cross wall of the piston block 28, the radial ports 46 are still partly uncovered by the valve thereby enabling pressure equalization between chambers A and B.

Figure 3:
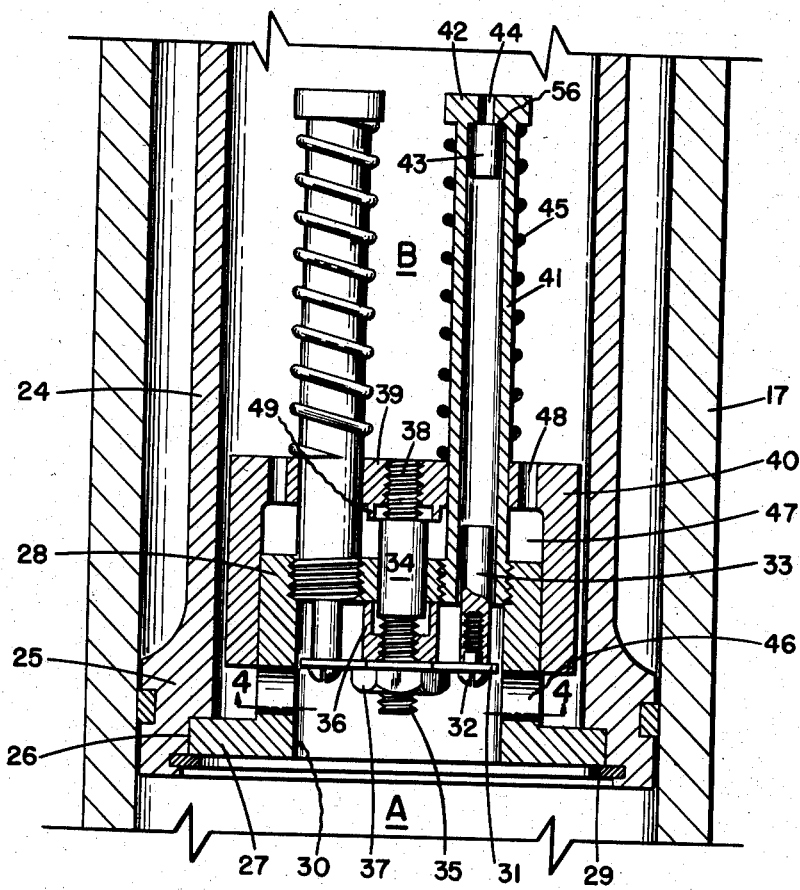
Figure 3 is a similar view but showing parts in another position.
Figure 4:
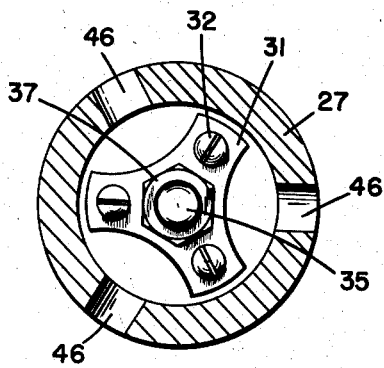
Figure 4 is a cross sectional view taken on line 4—4 in Figure 3 and looking in the direction of the arrows.

Upon landing, the strut is compressed and the volumetric capacity of chamber A reduced, causing some of the liquid stored therein to be displaced into chamber B to dissipate energy. During this initial compression of the strut, this displacement of liquid is effected partly through the tubes 41, which constitute the first path of communication between chambers A and B, and partly through the radial ports 46, which constitute the second path of communication between chambers A and B. Displacement of liquid through the first path of communication takes place by liquid flowing past the valve actuating piston 31 into the upper end of valve block 28, and therefrom through the tubes 41 via the annular space around stems 33 and through the upper outlet ports 44. As the liquid flows through the tubes, it will carry with it pistons 43, causing them to move from the stems 33 on which they are adapted to rest to the upper ends of the tubes as shown in Figure 3 to close outlet ports 44 or the first path of communication between chambers A and B. The speed at which floating pistons 43 travel upward into closing position of ports 44 is of a slower rate than that of the liquid displacement through the tubes, and is affected by such factors as the weights of the pistons 43, the area of the annular clearance surrounding the stems 33, the volumetric capacity of the tubes 41 and finally the pressure differential between chambers A and B. These factors are calculated to enable displacement of liquid through the first path of communication between chambers A and B in a manner causing, together with displacement of liquid through the second path, the initial impact of landing to gradually and smoothly build up a load in chamber A that is gradually dissipated by displacement of the liquid therefrom. In this instance, the size of the second path of communication between chambers A and B, that is, the extent to which the ports 46 are uncovered by the valve 40, depends on the pressure differential between the two chambers. As the pressure in chamber A increases, it acts on the valve actuating piston or spider 31 to lift the valve 40 from its lowest position on the valve block 28. The effective area of that spider piston is substantially equal to the combined cross sectional areas of the stems 33 and central stem 34, which stem, as long as the ports 44 are not closed by the floating pistons 43, is not subjected to fluid pressure.

After the first path of communication between chambers A and B is closed by the floating pistons 43, displacement of liquid takes place solely through the second path, that is, through the radial ports 46 of the block 28. In this instance, since the tube ports 44 are closed by floating pistons 43 and the stems 33 are subjected to fluid pressure, the effective area of the valve actuating piston 31 for raising the valve 40 is limited to the cross sectional area of the central stem 34, which effective area is opposed by the combined effort of the springs 45, thereby tending to maintain the valve in its lowermost position on block 28 and reduce the capacity of the second path 46 to its minimum. Variation of the load to which the strut is subjected during landing tends to vary the pressure in chamber A and results in a more or less complete opening of the second path 46. In other words, the position of the valve 40 relative to the radial ports 46 is regulated by the balance of opposed forces on the valve and its actuating piston 31. Any tendency toward a change of pressure in the hydraulic chamber A will automatically result in a change of the sizes of the openings of the second path 46 to enable more or less fluid to flow from that chamber into chamber B, and maintain substantially constant the pressure in the hydraulic chamber throughout the entire compression stroke of the strut.

Because of the complex nature of the flow pattern over the spider or valve actuating piston 31, it is difficult to estimate the effect of the liquid flow over this part. However, it is clear that by increasing the effective area of this piston, that is, increasing the diameter of the central stem 34, the result will be a smaller pressure in chamber A necessary to shift the valve into a more open position relative to the second path or ports 46, and that a reduction of the effective area of the piston 31 will, of course, require a greater pressure in chamber A to open the valve.

The details of structure and arrangements of parts shown and described may be variously changed and modified without departing from the spirit and scope of the invention.

I claim:

1. A shock absorbing strut comprising connected outer and inner casings arranged to telescope with a lower casing of intermediate diameter, a piston on the inner end of the inner casing, a fluid containing chamber on each side of said piston, a first and a second normally open path of communication between said chambers through said piston through which fluid is displaced to dissipate energy during compression of the strut, said first path comprising a tubular element carried by said piston leading from one of said chambers to the other, means within said tubular element responsive to initial fluid flow therethrough for closing said first path, and a valve slidable relative to said piston by virtue of pressure variation in one of said chambers for maintaining open said second path and controlling the effective size thereof.

2. A shock absorbing strut comprising connected outer and inner casings arranged to telescope with a lower casing of intermediate diameter, a piston on the inner end of the inner casing, a fluid containing chamber on each side of said piston, a first and a second normally open path of communication between said chambers through said piston through which fluid is displaced to dissipate energy during compression of the strut, said first path comprising a tubular element carried by said piston within one of said chambers and opening therefrom into the other chamber through said piston, an upper restricted open end for said element, a floating piston within said tubular element responsive to initial fluid flow therethrough for closing said upper end, and a valve slidable relative to said piston by virtue of pressure variation in one of said chambers for controlling the effective size of said second path.

3. A shock absorbing strut comprising connected outer and inner casings arranged to telescope with a lower casing of intermediate diameter, a piston on the inner end of the inner casing, a fluid containing chamber on each side of said piston, a first and second normally open path of communication between said chambers through said piston through which fluid is displaced to dissipate energy during compression of the strut, said first path comprising a plurality of tubular elements carried by said piston within one of said chambers and opening therefrom into the other chamber through said piston, upper restricted open ends for said elements, floating pistons within said tubular elements responsive to initial fluid flow therethrough for closing said upper ends, ports through said piston constituting said second path, and a valve slidable relative to said piston by virtue of pressure variation in one of said chambers for controlling the effective size of said ports.

4. A shock absorbing strut comprising connected outer and inner casings arranged to telescope with a lower casing of intermediate diameter, a piston on the inner end of the inner casing, a fluid containing chamber on each side of said piston, a first and a second normally open path of communication between said chambers through said piston through which fluid is displaced to dissipate energy during compression of the strut, axial and radial passageways through said piston constituting said first and second path respectively, means within said axial passageway responsive to initial fluid flow therethrough for closing same, and means slidable relative to said radial passageway by virtue of pressure variation in one of said chambers for controlling the effective size of said radial passageway.

5. A shock absorbing strut comprising two telescoping casings having a first and a second normally open path of communication therebetween through which fluid stored therein is displaced to dissipate energy during inward telescoping movement of said casings, a tubular element carried by one of said casings as a part of said first path, means within said element responsive to initial fluid flow therethrough for closing same, and valve means movable by virtue of pressure variation in one of said chambers for controlling the effective size of said second path.

6. A shock absorbing strut comprising outer and inner telescoping cylinders, a partition across said inner cylinder, a fluid containing chamber on each side of said partition, a first and second set of normally open passages between said chambers through said partition through which fluid is displaced to dissipate energy during compression of the strut, tubular elements carried by said partition as a part of said first set of passages, means slidable within said tubular elements by virtue of the initial fluid flow therethrough for closing said first set, and spring biased valve means movable on said partition by virtue of pressure variation in one of said chambers for maintaining open said second set of passages and controlling the effective size thereof.

7. A shock absorbing strut comprising connected outer and inner casings arranged to telescope with a lower casing of intermediate diameter, a piston on the inner end of the inner casing, a fluid containing chamber on each side of said piston, a first and a second normally open path of communication between said chambers through said piston through which fluid is displaced to dissipate energy during compression of the strut, said first path comprising a tube carried by said piston extending upwardly therefrom, a seat within the upper end of said tube, a floating piston normally within the lower end of said tube adapted to be moved on said seat to close said first path by virtue of the initial fluid flow through said tube, and a valve slidable relative to said piston by virtue of pressure variation in one of said chambers for controlling the effective size of said second path.

8. A shock absorbing strut comprising outer and inner telescoping cylinders, a partition across said inner cylinder, a fluid containing chamber on each side of said partition, a first and second normally open path of communication between said chambers through said partition through which fluid is displaced to dissipate energy during compression of the strut, valve means entirely carried by said partition responsive to initial fluid flow through said first path for closing same, and a piston actuated valve carried by said partition responsive to pressure variation in one of said chambers for controlling the effective size of said second path.

References Cited in the file of this patent
UNITED STATES PATENTS

| | | |
|---|---|---|
| 2,069,791 | Wallace | Feb. 9, 1937 |
| 2,471,294 | Watts | May 24, 1949 |
| 2,614,833 | Laugaudin | Oct. 21, 1952 |
| 2,707,119 | Bobrick | Apr. 26, 1955 |